(12) United States Patent
Neels et al.

(10) Patent No.: US 8,747,496 B2
(45) Date of Patent: Jun. 10, 2014

(54) COMPACT FUEL PROCESSOR

(75) Inventors: Jacobus Neels, Rosedale (CA);
Xuantian Li, Vancouver (CA); Richard Allan Sederquist, Middletown, CT (US); Andre Boulet, Vancouver (CA); William Allison Logan, Vancouver (CA)

(73) Assignee: Westport Power Inc., Vancouver, British Columbia (CA)

( * ) Notice: Subject to any disclaimer, the term of this patent is extended or adjusted under 35 U.S.C. 154(b) by 575 days.

(21) Appl. No.: 12/112,784

(22) Filed: Apr. 30, 2008

(65) Prior Publication Data

US 2008/0274021 A1      Nov. 6, 2008

Related U.S. Application Data

(60) Provisional application No. 60/915,116, filed on May 1, 2007, provisional application No. 60/954,803, filed on Aug. 8, 2007, provisional application No. 61/037,598, filed on Mar. 18, 2008.

(51) Int. Cl.
*B01J 7/00* (2006.01)

(52) U.S. Cl.
USPC ............ 48/61; 48/127.9; 48/127.1; 48/198.6; 48/197 R; 431/242; 422/168

(58) Field of Classification Search
USPC ................ 48/127.9, 127.1, 61, 197 R, 198.6; 431/116; 422/168
See application file for complete search history.

(56) References Cited

U.S. PATENT DOCUMENTS

| | | | | |
|---|---|---|---|---|
| 1,474,867 A | * | 11/1923 | Walker | 431/187 |
| 3,255,802 A | * | 6/1966 | Browning | 431/4 |
| 3,603,080 A | * | 9/1971 | McCrocklin | 60/303 |
| 3,899,303 A | * | 8/1975 | Gaysert | 422/176 |
| 3,955,941 A | | 5/1976 | Houseman et al. | |
| 3,971,847 A | | 7/1976 | Houseman | |
| 4,731,098 A | | 3/1988 | Marsch | |

(Continued)

FOREIGN PATENT DOCUMENTS

| | | |
|---|---|---|
| CA | 2 582 999 | 10/2007 |
| CN | 1185171 A | 6/1998 |

(Continued)

OTHER PUBLICATIONS

Office Action mailed Jul. 25, 2011 from the Chinese Patent Office in Chinese Patent Application No. 200880014450.9, which corresponds to the pending application.

(Continued)

*Primary Examiner* — Kaity V. Handal
(74) *Attorney, Agent, or Firm* — Corridor Law Group, P.C.

(57) ABSTRACT

A fuel processor for producing a hydrogen-containing product stream from a fuel stream and an oxidant stream, comprises a mixing tube from which the combined fuel and oxidant stream is directed substantially axially into a reaction chamber. The reaction chamber comprises a turn-around chamber and a turn-around wall at one end for re-directing the combined reactant stream, so that in the turn-around chamber the re-directed stream surrounds and is in contact with the combined reactant stream flowing substantially axially in the opposite direction. This design and opposing flow configuration creates a low velocity zone which stabilizes the location of a flame in the fuel processor and offers other advantages.

23 Claims, 5 Drawing Sheets

(56) References Cited

U.S. PATENT DOCUMENTS

| | | | |
|---|---|---|---|
| 4,737,161 A | 4/1988 | Szydlowski et al. | |
| 4,909,808 A | 3/1990 | Voecks | |
| 5,047,299 A | 9/1991 | Shockling | |
| 5,100,244 A * | 3/1992 | Kniebes | 374/36 |
| 5,207,185 A | 5/1993 | Greiner et al. | |
| 5,346,779 A | 9/1994 | Nakazawa | |
| 5,446,148 A | 8/1995 | Kutscher et al. | |
| 5,466,148 A * | 11/1995 | Witteveen | 431/116 |
| 5,529,484 A * | 6/1996 | Moard et al. | 431/242 |
| 5,681,159 A * | 10/1997 | Benedek et al. | 431/9 |
| 5,733,675 A | 3/1998 | Dederer et al. | |
| 6,126,908 A | 10/2000 | Clawson et al. | |
| 6,136,279 A | 10/2000 | Stahl | |
| 6,390,030 B1 | 5/2002 | Isogawa | |
| 6,444,342 B1 | 9/2002 | Doshi et al. | |
| 6,481,207 B2 | 11/2002 | Miura et al. | |
| 6,835,354 B2 | 12/2004 | Woods et al. | |
| 6,936,238 B2 | 8/2005 | Sennoun et al. | |
| 7,037,472 B2 | 5/2006 | Komiya et al. | |
| 7,070,634 B1 | 7/2006 | Wang | |
| 7,263,822 B2 | 9/2007 | Bender et al. | |
| 7,273,514 B2 * | 9/2007 | Bailey et al. | 95/279 |
| 7,748,976 B2 * | 7/2010 | Burrahm et al. | 431/2 |
| 2003/0037550 A1 * | 2/2003 | Fassbender | 60/772 |
| 2003/0188475 A1 | 10/2003 | Ahmed et al. | |
| 2006/0225482 A1 * | 10/2006 | Silvis | 73/1.26 |
| 2006/0234174 A1 | 10/2006 | Burrahm et al. | |
| 2007/0130830 A1 | 6/2007 | Varatharajan et al. | |
| 2007/0275280 A1 | 11/2007 | Lee et al. | |

FOREIGN PATENT DOCUMENTS

| | | |
|---|---|---|
| CN | 1267562 A | 9/2000 |
| EP | 1 118 583 | 7/2001 |
| EP | 1 182 723 | 2/2002 |
| WO | WO 2006/009495 | 1/2006 |

OTHER PUBLICATIONS

Office Action mailed Sep. 19, 2011 from the Canadian Intellectual Property Office in Canadian Patent Application No. 2,701,770, which corresponds to the pending application.

Office Action issued on Sep. 19, 2011, in connection with Canadian Patent Application No. 2,701,770.

\* cited by examiner

Section A-A

Section B-B

COMPACT FUEL PROCESSOR

CROSS-REFERENCE TO RELATED APPLICATION

This application is related to and claims priority benefits from U.S. Provisional Patent Application Ser. No. 60/915,116 filed May 1, 2007, entitled "Syngas Generator"; U.S. Provisional Patent Application Ser. No. 60/954,803 filed Aug. 8, 2007, entitled "Syngas Generator"; U.S. patent application Ser. No. 11/935,282 filed Nov. 5, 2007, entitled "Fuel Processor, Components Thereof and Operating Methods Therefor"; and U.S. Provisional Patent Application Ser. No. 61/037,598 filed Mar. 18, 2008, entitled "Compact Fuel Processor", each of which is hereby incorporated by reference in its entirety.

FIELD OF THE INVENTION

The present invention relates to a fuel processor for producing a hydrogen-containing gas stream, such as a syngas stream. The present apparatus and methods are particularly suitable for fuel processors that are used in engine system applications, where a hydrogen-containing gas is required and space is limited.

BACKGROUND OF THE INVENTION

For engine systems in vehicular or other mobile applications where a supply of hydrogen is required, due to challenges related to on-board storage of a secondary fuel and the current absence of a hydrogen refueling infrastructure, hydrogen is preferably generated on-board using a fuel processor. The hydrogen-containing gas from the fuel processor can be used to regenerate, desulfate and/or heat engine exhaust after-treatment devices, can be used as a supplemental fuel for the engine, and/or can be used as a fuel for a secondary power source, for example, a fuel cell.

One type of fuel processor is a syngas generator (SGG) that can convert a fuel into a gas stream containing hydrogen ($H_2$) and carbon monoxide (CO), known as syngas. Air and/or a portion of the engine exhaust stream can be used as an oxidant for the fuel conversion process. The exhaust stream typically contains oxygen ($O_2$), water ($H_2O$), carbon dioxide ($CO_2$), nitrogen ($N_2$) and sensible heat, which can be useful for the production of syngas. Steam and/or water can optionally be added. The fuel supplied to the SGG can conveniently be chosen to be the same fuel that is used in the engine. Alternatively a different fuel can be used, although this would generally require a separate secondary fuel source and supply system specifically for the SGG. The $H_2$ and CO can be beneficial in processes used to regenerate exhaust after-treatment devices. For other applications, for example, use as a fuel in a fuel cell, the syngas stream may require additional processing prior to use.

Syngas production can be segregated into three main processes: mixing, oxidizing and reforming, as illustrated in FIG. 1. The first process is the mixing process and it generally takes place at or near the inlet, where the oxidant and fuel streams are introduced into the SGG, in the so-called "mixing zone". The primary function of the mixing process is to supply an evenly mixed and distributed fuel-oxidant mixture for subsequent combustion and reformation. If the fuel is a liquid it is typically atomized and vaporized, as well as being mixed with an oxidant in this zone. The next process, the oxidizing process, takes place downstream of the mixing zone, in the so called "combustion zone". The primary function of the oxidizing process is to ignite the fuel-oxidant mixture to produce $H_2$ and CO as primary products as well as the sensible heat required for downstream endothermic reformation reactions. The final process, the reforming process, is where oxidation products and remaining fuel constituents are further converted to $H_2$ and CO via reforming reactions, in the so-called "reforming zone". The syngas stream then exits the SGG and is directed for additional downstream processing and/or to the appropriate hydrogen-consuming device(s). There is not strict separation between the zones; rather, the zones transition or merge into one another, but the primary processes happening in each of the zones are typically as described above.

In vehicular or other mobile applications, an on-board SGG should generally be low cost, compact, light-weight and efficiently packaged with other components of the engine system. Some particular challenges associated with the design of fuel processors used in engine systems to convert a fuel and engine exhaust gas stream into a hydrogen-containing stream include the following:

(a) Engine exhaust stream output parameters, such as mass flow, pressure, temperature, composition and emission levels, vary significantly over the operating range of the engine.

(b) The output required from the fuel processor is typically variable. The hydrogen-containing gas stream is preferably generated as-needed in accordance with the variable demand from the hydrogen-consuming devices. This reduces the requirement for additional storage and control devices.

(c) Thorough mixing of the fuel and oxidant reactants is important. With liquid fuels, inadequate vaporization and mixing of the fuel with the oxidant stream can lead to localized fuel-rich conditions, resulting in the formation of coke or soot (carbon), residues and hot spots. At typical SGG operating temperatures, for example, 1000° C.-1200° C., the time to introduce and vaporize the fuel while effectively mixing the fuel with the oxidant stream is limited due to the extreme internal temperatures.

(d) The engine exhaust stream pressure is limited, especially at engine idle conditions. The pressure available to aid in the mixing and distribution of fuel with the oxidant stream is therefore limited under at least some operating conditions.

(e) High engine exhaust back-pressure can decrease the efficiency and performance of the engine, increasing the operating cost. Preferably, the pressure drop across the fuel processor and its associated components (for example, mixing and metering devices, and particulate filter) is therefore kept low.

(f) High system reliability and durability are typically required.

(g) The internal combustion engine exhaust after-treatment market has cost, volume, and weight constraints, particularly for vehicular applications.

A cylindrical shaped reactor with a flow-through configuration, where a combined fuel and oxidant reactant mixture flows downstream predominantly in one direction axially through the cylinder, has been commonly used for fuel processors or SGGs. The shortcomings of these types of reactors include: portions of the reactor volume may not be fully utilized, additional devices may be required to promote mixing and/or distribution of the reactants, and additional devices may be required to stabilize the location of the combustion flame in the reactor. These shortcomings can increase the volume, weight, cost, and/or reduce the operating range of the fuel processor.

During a start-up process for a fuel processor, a secondary oxidant and fuel stream circuit or combustor are often employed to generate heat at lean or stoichiometric conditions, reducing the time for the fuel processor to reach a desired operating temperature. The secondary oxidant and fuel stream circuit or combustor used because an undesirable amount of carbon can be generated if the primary oxidant and fuel stream circuits are employed during the start-up process. However, the requirement for a secondary oxidant and fuel stream circuit or combustor increases the complexity, size, and cost of the fuel processor.

The present fuel processor with improved reactor design, components and operating methods is effective in addressing at least some of the issues discussed above, both in engine system applications and in other fuel processor applications.

SUMMARY OF THE INVENTION

A fuel processor, for producing a hydrogen-containing product stream from a fuel stream and an oxidant stream, comprises a fuel inlet port, an oxidant inlet port, a product outlet port, and an outer shell housing a reaction chamber. The fuel processor further comprises a mixing tube fluidly connected to receive the oxidant stream from the oxidant inlet port and the fuel stream from the fuel inlet port. The mixing tube is for forming a combined reactant stream and directing it substantially axially into the reaction chamber. The reaction chamber further comprises a turn-around chamber (which is a portion of the overall reaction chamber) and a turn-around wall at one end of the turn-around chamber. The turn-around wall is for re-directing the combined reactant stream, so that in the turn-around chamber the re-directed stream surrounds and is in contact with the combined reactant stream flowing substantially axially in the opposite direction. During operation of the fuel processor it is believed that a low velocity zone is created between the opposing reactant streams in the turn-around chamber. This stabilizes the location of the combustion flame in the fuel processor.

In some embodiments fuel processor comprises a glow plug or other ignition device for initiating combustion reactions within the reaction chamber. The glow plug or other ignition device is advantageously located within the turn-around chamber with its tip in the low velocity zone.

In other embodiments, a fuel processor for producing a hydrogen-containing product stream from a fuel stream and an oxidant stream comprises a fuel inlet port, an oxidant inlet port, a product outlet port, and an outer shell housing a reaction chamber. The fuel processor further comprises a mixing tube fluidly connected to receive the oxidant stream from the oxidant inlet port and the fuel stream from the fuel inlet port. The mixing tube is for forming a combined reactant stream and directing it substantially axially into the reaction chamber. There is a turn-around wall at one end of the reaction chamber which re-directs the combined reactant stream exiting the mixing tube in a substantially opposing direction and an annular particulate filter disposed substantially concentrically around the mixing tube.

In the above embodiments, in order that the gas streams flowing in substantially opposite directions are in contact with one another so that the low velocity zone is created, the turn-around chamber is preferably free of flow separation structures and flow impeding structures. Also, preferably the turn-around chamber does not contain a catalyst for promoting conversion of the fuel and oxidant streams.

In the above embodiments, the turn-around wall can be specially shaped to re-direct the combined reactant stream outwardly from a central axis and then back through the turn-around chamber in substantially the opposite direction. For example, it can be shaped with a central peak that protrudes towards the mixing tube and is aligned with the axis of the mixing tube.

In the above embodiments, the fuel processor can further comprise a heat exchanger housed within the shell for transferring heat from the product stream to the incoming oxidant stream.

A method of operating a fuel processor comprises:
(a) introducing an oxidant stream and a fuel stream into the fuel processor and mixing the fuel and oxidant streams to form a combined reactant stream;
(b) directing the combined reactant stream substantially axially into a turn-around chamber within the fuel processor, so that it impinges on a turn-around wall and is re-directed by the wall to flow in a substantially opposite direction so that it surrounds and is in contact with the combined reactant stream flowing axially into the turn-around chamber;
(c) at least partially combusting and converting the combined reactant stream within the turn-around chamber to form a hydrogen-containing product stream.

In preferred embodiments of the method, a low velocity zone is created at the interface between the opposing streams flowing in the turn-around chamber, which stabilizes the location of the combustion flame in the fuel processor.

The method can further comprise directing the fuel stream and the oxidant stream through a mixing tube located upstream of the turn-around chamber, and optionally through a critical flow venturi located upstream of the mixing tube.

The method can further comprise directing the product stream, as well as residual unreacted combined reactant stream, through a particulate filter that is located within the fuel processor, downstream of the turn-around chamber. If there is some unreacted combined reactant stream remaining, it can be further converted as it passes through the particulate filter. In a compact design, the filter can be an annular particulate filter disposed substantially concentrically around the mixing tube if present.

The method can further comprise transferring heat from the product stream to the oxidant stream via a heat exchanger located within the fuel processor. The heat exchanger can be, for example, a concentric sleeve type heat exchanger, with the oxidant stream being directed through an inner tube of the heat exchanger upstream of the mixing tube, and the product stream being directed through an outer annular chamber of the heat exchanger prior exiting the fuel processor. Preferably the oxidant stream and the product stream are directed through the concentric sleeve type heat exchanger in a co-flow configuration.

In embodiments of a start-up method, a fuel stream and an oxidant stream are supplied to the fuel processor and are mixed to form a combined reactant stream. An oxidation process is initiated within the fuel processor which generates heat. The fuel and oxidant stream are supplied at a substantially stoichiometric ratio when a monitored parameter of the fuel processor is below a pre-determined threshold value, and the ratio of fuel to oxidant is increased once the monitored parameter reaches the pre-determined threshold value. The parameter can be, for example, an operating temperature or an elapsed operating time of the fuel processor. In preferred embodiments, the ratio of fuel to oxidant is controlled by controlling the mass flow rate of the fuel. The oxidant stream and the fuel stream can be directed through a critical flow venturi.

In the apparatus and methods described above the fuel processor is preferably a non-catalytic syngas generator. In engine system applications the oxidant inlet port can be fluidly connected to receive exhaust gas from a combustion engine, so that the oxidant stream comprises engine exhaust gas along with additional air (or another oxidant) or consists essentially of exhaust gas.

In the fuel processor design and operating methods described above, an opposing reactant stream flow configuration creates a low velocity zone in a turn-around chamber which stabilizes the location of a flame in the fuel processor and offers other advantages as described in further detail below.

BRIEF DESCRIPTION OF THE DRAWING(S)

FIG. 3b is a cross-sectional side view of the syngas generator illustrated in FIG. 3a.

DETAILED DESCRIPTION OF PREFERRED EMBODIMENT(S)

Figure 1:
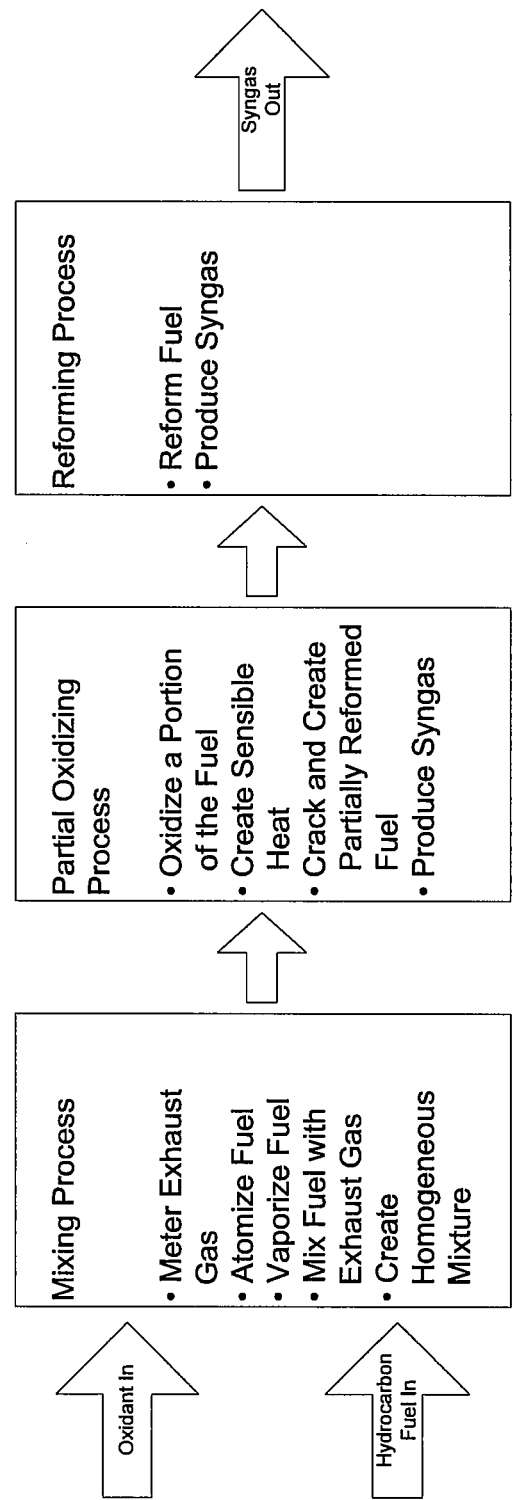
FIG. 1 is a process flow chart illustrating a typical fuel conversion process in a syngas generator.

FIG. 1 illustrates a typical syngas generator (SGG) fuel conversion process, and is described above.

Figure 2:
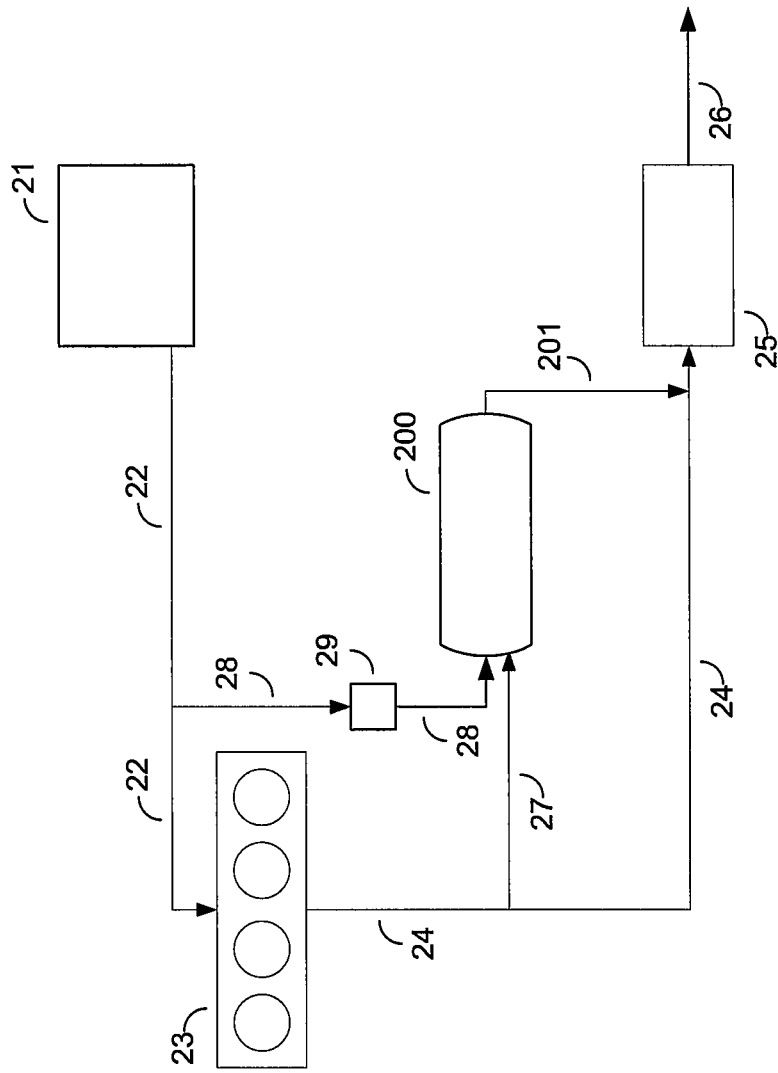
FIG. 2 is a schematic diagram of an embodiment of an internal combustion engine system with a fuel processor and an exhaust after-treatment system.

FIG. 2 illustrates schematically an embodiment of an engine system with a fuel processor and an exhaust after-treatment system. In this illustrated embodiment the fuel processor is a syngas generator (SGG). In FIG. 2, fuel tank 21 supplies liquid fuel, through fuel supply line 22, to combustion engine 23. An optional fuel filter, fuel pump, fuel pressure regulating device and fuel flow control device (all not shown in FIG. 2) can be integrated into fuel tank 21, or into fuel supply line 22. An optional fuel return line (not shown in FIG. 2) can return fuel back to fuel tank 21. Combustion engine 23, could be a diesel, gasoline, liquefied petroleum gas (LPG), kerosene, natural gas, propane, methanol, ethanol, fuel oil, or other hydrocarbon, alcohol or suitably fueled engine of, for example, a compression ignition or spark ignition type. Combustion engine 23 can be of various designs including reciprocating piston, Wankel, and gas turbine. The engine can be part of a vehicular or non-vehicular system. The combustion engine typically comprises a conventional air supply subsystem (not shown in FIG. 2) to supply air to the engine.

Engine exhaust line 24, directs at least a portion of the engine exhaust stream to exhaust after-treatment subsystem 25. Engine exhaust line 24 can incorporate other emissions reduction devices such as exhaust gas recirculation (EGR) systems (not shown in FIG. 2). Engine exhaust line 24 can contain a turbo-compressor and/or intercooler (not shown in FIG. 2). Exhaust after-treatment subsystem 25, can comprise various exhaust after-treatment devices such as Lean NOx Traps (LNTs), Diesel Particulate Filters (DPFs), Diesel Oxidation Catalysts (DOCs), and a noise muffler and associated valves, sensors and controllers. The treated engine exhaust gas stream flows through exhaust pipe 26 and exits into the surrounding atmosphere.

A portion of the engine exhaust stream from line 24 is directed to SGG 200, via SGG oxidant inlet line 27. Optionally, air from an air supply sub-system, and/or water or steam from a steam supply sub-system (not shown in FIG. 2) can also be introduced into SGG 200 via oxidant inlet line 27 and/or via one or more other inlets, at some points or continuously during operation of SGG 200. Fuel from fuel tank 21, is supplied from fuel supply line 22 to SGG 200 via SGG fuel inlet line 28. An optional fuel filter, fuel pump, fuel pressure regulating device and/or fuel heat exchanger (all not shown in FIG. 2) can be integrated into SGG fuel inlet line 28. Optionally, a fuel pre-heater can also be incorporated into the system. A fuel metering assembly 29 in line 28 controls the mass flow and pressure of the fuel supplied to SGG 200. The oxidant stream is metered internally in SGG 200 using a critical flow venturi (CFV).

SGG 200 converts the fuel and the oxidant stream, comprising engine exhaust, into a syngas stream. At least a portion of the syngas stream produced is supplied via syngas outlet line 201 to exhaust after-treatment subsystem 25. Syngas outlet line 201 can contain optional valves, sensors, controllers or similar equipment. The syngas stream is used to regenerate, desulfate and/or to heat one or more devices in exhaust after-treatment subsystem 25, and can be directed to other hydrogen-consuming devices within the overall system, such as fuel cells (not shown) and/or to the engine itself.

Figure 3A:
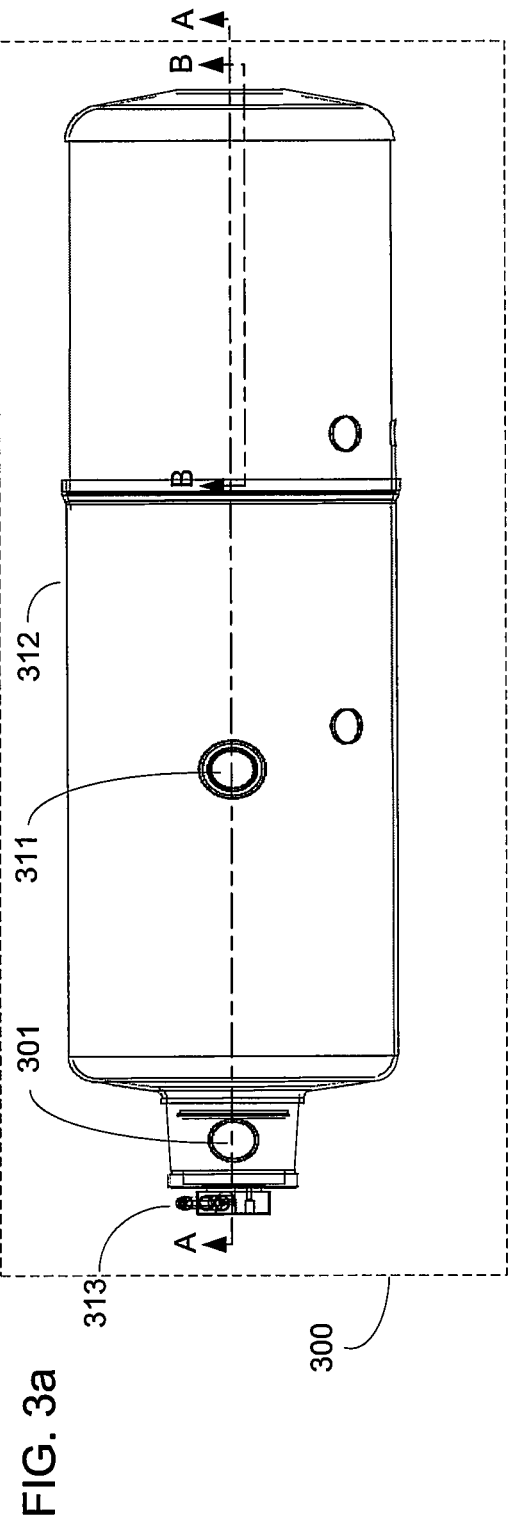
FIG. 3a is a top view of a syngas generator.
Figure 3B:
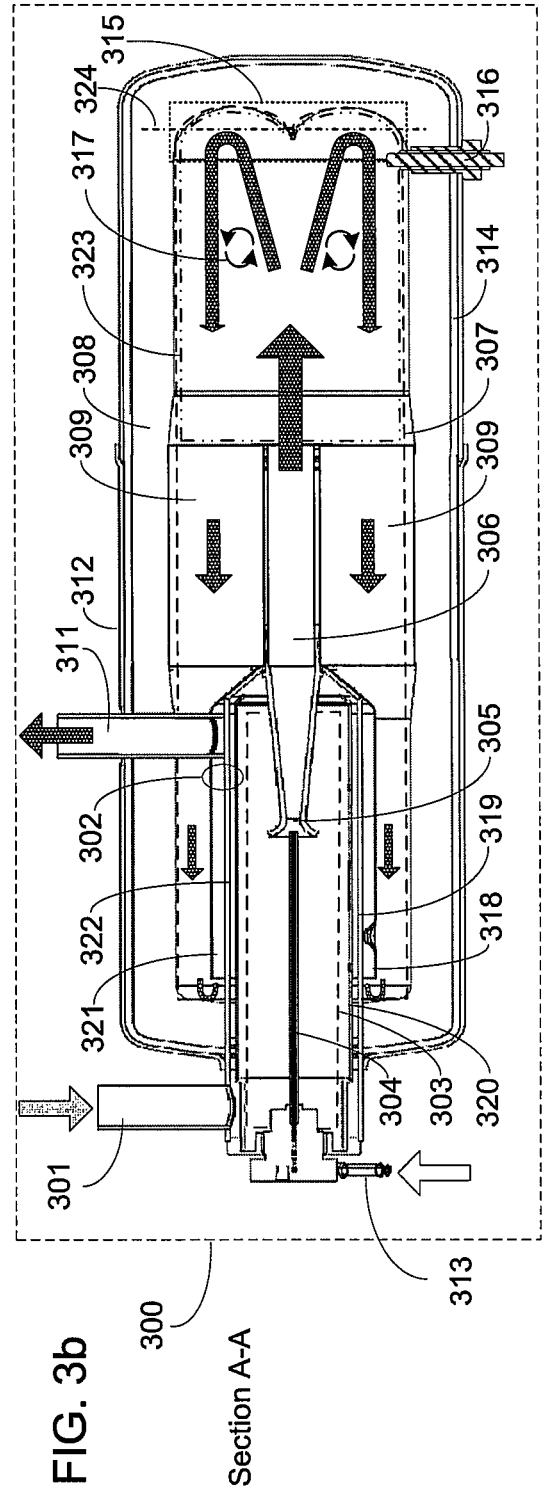

FIG. 3a is a top view while FIG. 3b is a cross-sectional view (along section A-A of FIG. 3a) of an embodiment of a SGG 300. In FIGS. 3a and 3b, the oxidant stream enters SGG 300 through oxidant inlet conduit 301, flowing through an optional tube-in-tube or concentric sleeve type heat exchanger 302, and into oxidant chamber 303. Heat exchanger 302 can be a different type of heat exchanger, for example a coiled tube or plate type. A fuel stream is introduced into the oxidant stream near the inlet or throat of a CFV (critical flow venturi) 305 via fuel inlet conduit 313 and fuel introduction tube 304. The fuel stream and oxidant stream continue to flow downstream through CFV 305 and into a mixing tube 306, forming a combined reactant stream. In FIGS. 3a and 3b, oxidant inlet conduit 301 and outlet conduit 311 are illustrated as extending vertically upwards from the top of SGG 300, with fuel inlet conduit 313 extending downwardly. Oxidant inlet conduit 301, outlet conduit 311 and fuel inlet conduit 313 can be orientated at positions other than illustrated in FIGS. 3a and 3b.

When the combined fuel and oxidant stream travels through CFV 305, the combined reactant stream reaches sonic speeds preferably during at least a portion of the designed operating range of SGG 300, and more preferably during most of the designed operating range of SGG 300. During at least a portion of the operating range, the parameters (air-fuel ratio, temperature, pressure) of the combined reactant stream typically cause the stream to be within its flammability and auto-ignition range. The speed of the combined reactant stream within CFV 305 and mixing tube 306 is preferably maintained above the flame speed of the stream. This reduces the possibility of a flashback propagating upstream to the CFV. The residence time of the combined reactant stream within CFV 305 and mixing tube 306 is preferably maintained below the auto-ignition delay time of the stream during at least a portion of the operating range, reducing the possibility for auto-ignition to occur within the CFV and mixing tube. CFV 305 and mixing tube 306 are preferably located essentially concentrically about the longitudinal axis of SGG 300. Reaction chamber 307 is indicated in FIG. 3b by a dashed line. The combined reactant stream exits mixing tube 306 at a high speed, for example, above the local flame speed, flowing into a reaction chamber 307, which is formed and thermally insulated by insulation 308. Insulation 308 is preferably formed using a vacuum-forming process. The thermal insulation preferably comprises one or more layers of ceramic insulation material with different thermal conductivity and mechanical properties. A multi-layer insulation configuration enables a designed heat loss for the SGG over its operating range. A second layer of insulation is shown in FIG. 3*b* as insulation 314.

Figure 4:
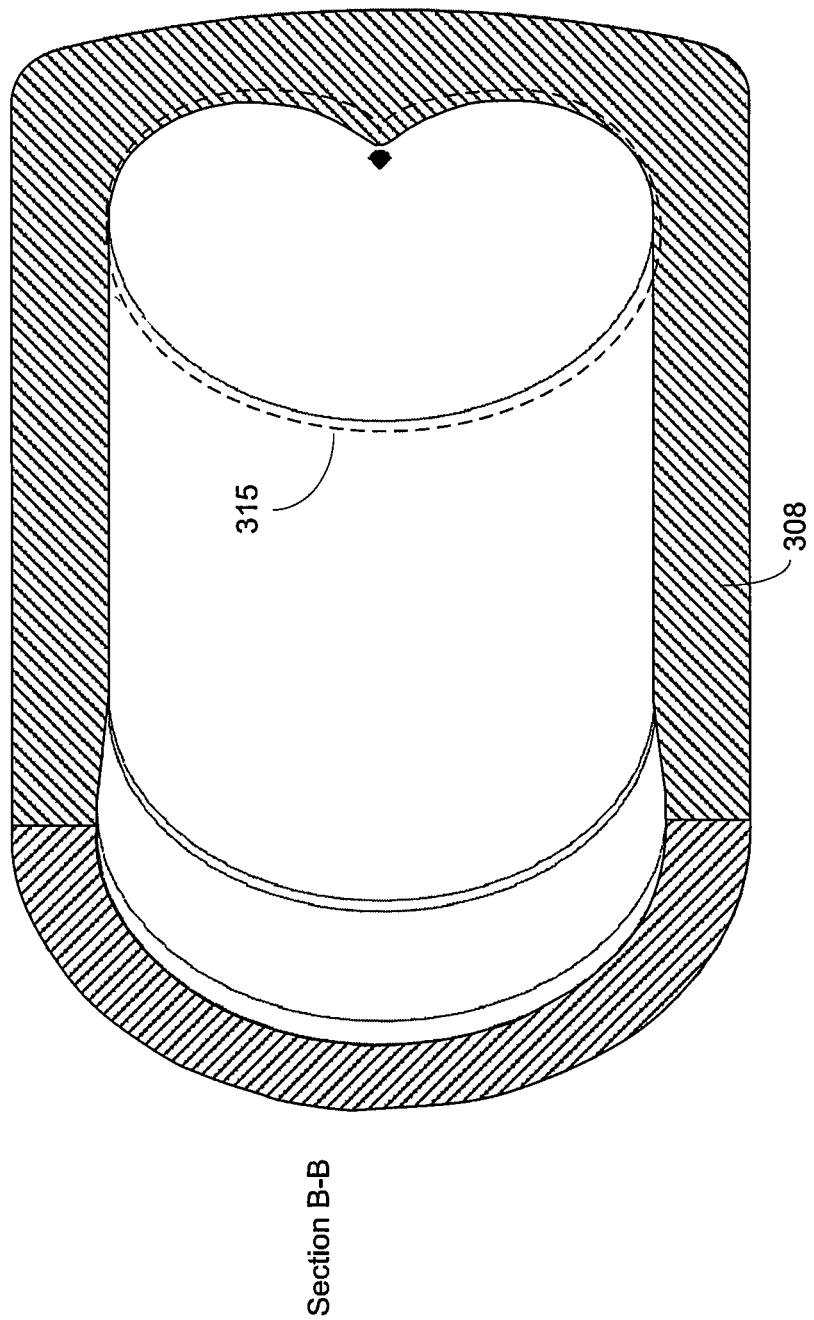
FIG. 4 is a cross-sectional perspective view of a turn-around wall formed by the insulation within the syngas generator.

In the illustrated embodiment, the combined reactant stream flows essentially parallel with and close to the longitudinal axis of reaction chamber 307, and impinges on turn-around wall 315, causing the stream to disperse or expand in a diverging radial direction. The combined reactant stream is "reflected" by turn-around wall 315, to turn-around or flow in substantially the opposite direction (from its direction as it exits mixing tube 306) closer to the perimeter walls of reaction chamber 307 and into an annular particulate filter 309, which is located in reaction chamber 307 surrounding mixing tube 306. The portion of reaction chamber 307 in which there is a central jet of combined reactant stream flowing in one direction that is surrounded by (and in contact with) reactant stream flowing in substantially the reverse direction is referred to herein as turn-around chamber 323. Turn-around chamber 323 is indicated in FIG. 3*b* by a dot-dot-dashed line. The cross-sectional area of the combined reactant stream exiting mixing tube 306, is small compared to the cross-sectional area of turn-around chamber 323, allowing for the expansion of the combined reactant stream as it flows into turn-around chamber 323. Turn-around wall 315 is formed by insulation 308, and in the illustrated embodiment has a conformation such that the impinging combined reactant stream is flared axially outward from a central point that is longitudinally aligned with the impinging stream and is reflected to flow in substantially the reverse direction. Turn-around wall 315 is preferably shaped to suitably or beneficially distribute the flow of the combined reactant stream within turn-around chamber 323. For example, it can be shaped as a semi-ring torus, semi-horn torus, semi-cone torus, semi-sphere or pan. FIG. 4 is a cross-sectional view (along section B-B shown in FIG. 3*a*) of turn-around wall 315, formed in insulation 308, with a semi-horn torus shape. Turn-around wall 315 need not to be formed from the insulation 308, but can be a discrete component and/or be constructed from a different material. There is no barrier, sleeve, baffle, catalyst bed, monolith or other structure in turn-around chamber 323 separating the combined reactant stream as it flows in one direction (exiting mixing tube 306) and in the opposing direction (after redirection by turn-around wall 315), into an annular particulate filter 309. The outer or surrounding stream that is flowing towards particulate filter 309 will generally be flowing more slowly than the central jet exiting mixing tube 306. Where the two streams are in contact the local velocity will typically be low or close to zero, and there will be some mixing between the streams. The configuration (dimensions, shape and location) of mixing tube 306, turn-around chamber 323, and turn-around wall 315, along with an open or barrier-free turn-around chamber 323 with bi-directional flow, assists in the formation of recirculation zones and/or eddies (shown as arrows 317). It is believed that the low velocity zone or region where the two opposing streams contact each other and eddies 317 occur, helps to stabilize the location of the combustion flame. The local speed of the combined reactant stream at or near eddies 317 will generally be lower than the flame speed of the stream. Furthermore, the local fluid dynamics replenishes and mixes fresh un-combusted reactants with hot combusted reactants enabling a continuous combustion process to occur, which will generally be self-sustaining after initiation. A fuel processor with a "turn-around" chamber, such as that described, offers one or more possible advantages including:

(a) Increasing the stability of the combustion flame through the creation of a low velocity zone where mixing of the opposing streams occurs, as described in the foregoing paragraph.

(b) The flow pattern of the combined reactant stream can be designed to locate the low velocity zone within a desirable location in the reaction chamber through the designed operating range of SGG 300.

(c) In the low velocity zone between the two opposing streams the velocity is low enough that the flame can burn without being blown away or blown out (extinguished), even as the mass flow rate of the incoming combined reactant stream is increased. Thus, a turn-around design can increase the space velocities of the reactants without adversely affecting the location and stability of the combustion flame. This can be achieved without the use of additional components (for example, a bluff body) to stabilize the location of the flame, thereby also reducing cost. A two to four-fold increase in space velocity (depending on the oxidant stream) has been demonstrated with a SGG with a turn-around chamber compared to a SGG with conventional straight, flow-through design, while maintaining a stable flame and syngas quality.

(d) A turn-around design makes more efficient use of the reactor volume, allowing the fuel processor to be more compact. For example, in a conventional straight flow-through combustion chamber the volume surrounding the incoming reactant jet is typically not used effectively, whereas in a turn-around design the space around the central jet is occupied by the stream flowing back in the opposite direction. The impingement of the combined reaction stream on the turn-around wall (which reduces the local velocities) and the formation of the low velocity zone assist in stabilizing the flame which allows for greater space velocities through the fuel processor.

(e) Because of the mixing of the opposing streams, the incoming combined reactant stream is rapidly heated by the partially combusted stream, facilitating ignition and combustion even if the incoming stream has a low oxygen content (such as if the SGG is operating on engine exhaust gas).

In preferred embodiments, the average diameter of turn-around chamber 323, is larger than the diameter of the outlet of mixing tube 306, by about 3-7 times, or more preferably by about 5 times. The distance from the outlet of mixing tube 306 to the turn-around wall 315 is preferably about 4-11 times the diameter of the outlet of mixing tube 306, or more preferably about 7-8 times the diameter of the outlet of mixing tube 306. Since turn-around wall 315 is generally not flat, the distance referred to is the distance measured, parallel to the longitudinal access of the mixing tube, from the mixing tube outlet to the average plane of turn-around wall, shown in FIG. 3*b* as plane 324. It has been found that this preferred distance range enables the expansion of the stream, reduction in the speed of the stream and formation of eddies 317 in reaction chamber 307, upstream of particulate filter 309. Mixing tube 306, reaction chamber 307 and turn-around chamber 323 are preferably cylindrical and/or conical in shape, but need not be.

Glow plug 316 (shown in FIG. 3*b*), is attached to shell 312, and located in turn-around chamber 323 to initiate combustion or ignite the combined reactant stream during start-up and optionally at other operating points of SGG 300. In preferred embodiments, glow plug 316 is located within or near the zone where the local velocity of the combined reactant stream is low (for example, below the flame speed of the stream) and within the spray pattern of the fuel droplets during start-up of SGG 300. For example, it can be positioned close to the plane where the cylindrically shaped profile of turn-around chamber 323 meets the toroidally shaped profile of turn-around wall 315. In some embodiments this is 10±4 mm from the surface of turn-around chamber 323 or insulation 308 and in the lower or lowest portion of the chamber. This positioning can offer several advantages including: (a) increasing the reliability and speed of flame initiation during start-up as the fuel can come in direct contact with the glow plug 316, especially when it is located in the lower portion of the chamber as the effects of gravity will tend to pull the spray of fuel droplets towards the glow plug; and (b) increasing the volume utilization of turn-around chamber 323 and/or reaction chamber 307, as the combustion flame can be initiated and anchored close to the turn-around wall end of the chamber. Alternatively, one or more glow plugs can be employed, the glow plugs can be employed to sense the temperature of turn-around chamber 323 and/or reaction chamber 307, other ignition devices for example a wire, or mesh can be employed.

The oxidation and then reforming reaction processes occur gradually as the reactant moves through turn-around chamber 323. The stream continues through an annular particulate filter 309, where carbon particulates are trapped and stored until a carbon gasification process is initiated, or alternatively are immediately oxidized by a continuous carbon gasification process. The product syngas stream continues to flow towards the end of reaction chamber 307 that is opposite to turn-around wall 315, before reversing direction again and passing through optional heat exchanger 302, and exiting SGG 300 via outlet conduit 311.

In the illustrated embodiment, heat exchanger 302 is a tube-in-tube or concentric sleeve type of heat exchanger which transfers heat from the product syngas stream to the incoming oxidant stream. Heat exchanger 302 comprises three sleeves located concentrically: outer sleeve 318, intermediate sleeve 319 and inner sleeve 320. Outer sleeve 318 and intermediate sleeve 319 form an annular outer chamber 321 through which the product syngas stream flows from reaction chamber 307, prior to exiting SGG 300 via outlet conduit 311. Intermediate sleeve 319 and interior sleeve 320 form an inner chamber 322 through which the oxidant stream flows from oxidant inlet conduit 301 to oxidant chamber 303. Intermediate sleeve 319 fluidly separates the oxidant stream from the product syngas stream and transfers heat energy from the product syngas stream to the oxidant stream. Heat exchanger 302 can be subject to extreme temperatures, for example up to about 1200° C., thermal cycling and thermal stress. The individual sleeves are preferably fabricated with a limited number of joints and/or welded joints and are more preferably fabricated from a single piece of material to increase their durability. The concentric sleeve type of heat exchanger offers several advantages including compact volume, the ability to tailor the amount of heat transfer between fluids, and the ability to increase in scale without adversely affecting the volume and/or pressure drop of the heat exchanger. Heat exchanger 302, is preferably located concentrically about the longitudinal axis of combustion chamber 307 and SGG 300, with the sleeves configured so that the product syngas stream and oxidant stream flow though the heat exchanger 302 in a co-flow direction (although the sleeves can be configured to allow other relative flow directions). A co-flow gas stream configuration limits the maximum temperature achievable by the incoming oxidant stream to the outlet temperature of the product syngas stream. A co-flow configuration offers several advantages including some self-regulation of the oxidant stream temperature (by altering the gas density and thus mass flow rate of the oxidant through the CFV, which then affects the resultant temperature of the product syngas stream and the amount of heat supplied to the heat exchanger) and cooling of heat exchanger 302, which reduces its exposure to temperature extremes. In some applications, for example when air or a high oxygen-content oxidant reactant is employed, heat exchanger 302 (and optionally a portion of shell 312, insulation 308, insulation 314, and reaction chamber 307 used to house heat exchanger 302) can be eliminated from SGG 300, further reducing the volume and cost of a SGG.

Figure 5:
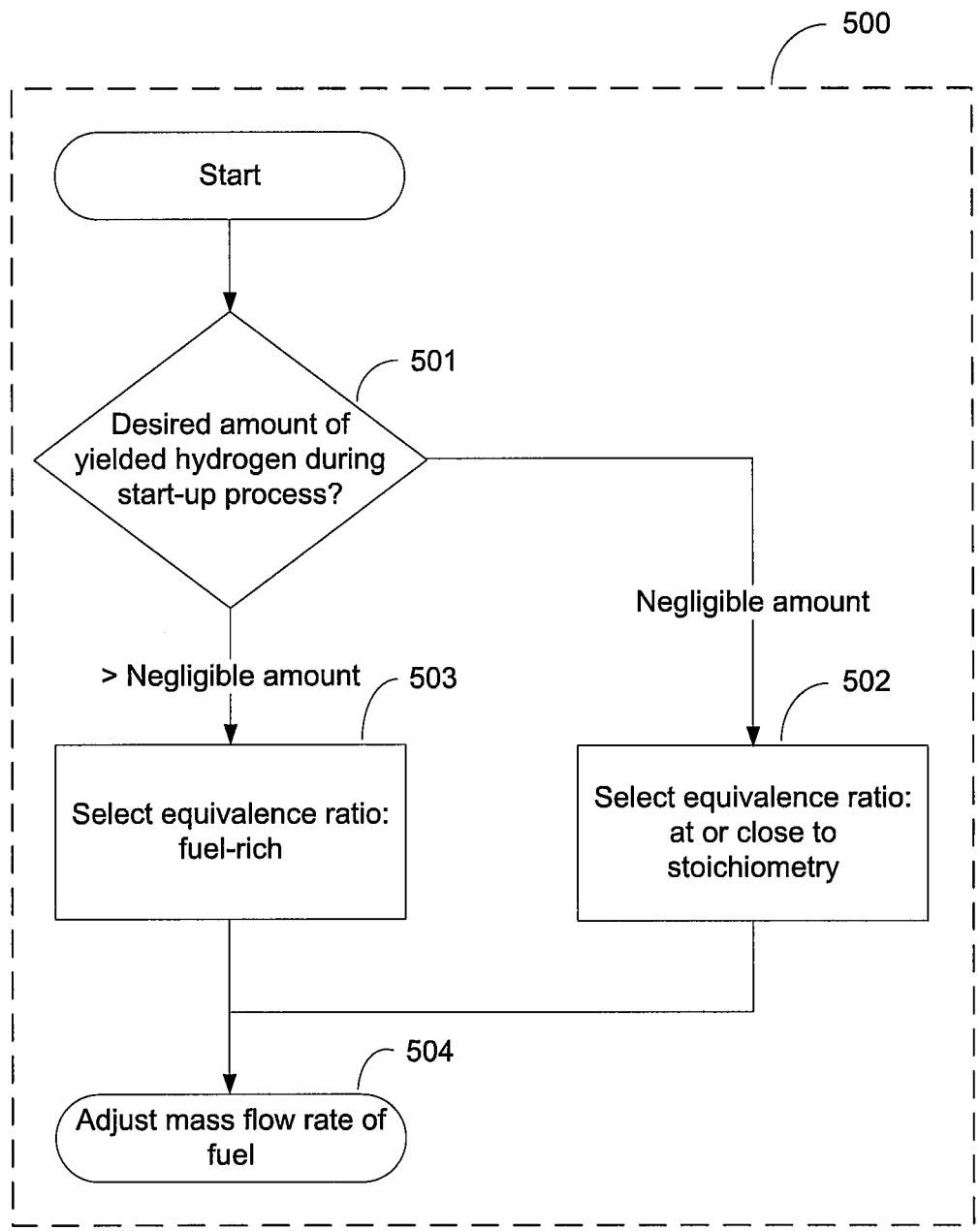
FIG. 5 is a flow chart of an embodiment of a start-up process for a syngas generator, illustrating steps to determine the mass flow setting of the fuel.

In embodiments of a start-up process for a SGG and/or a system which consumes syngas, the SGG can selectively operate to yield a limited amount of hydrogen or to yield a negligible amount of hydrogen in the product stream by adjusting the equivalence ratio (or air-to-fuel ratio) of the inlet oxidant and fuel reactant streams. In FIG. 5, process 500 is an example of a start-up process for a syngas generator illustrating steps to determine the mass flow setting of the fuel. Process 500 begins with step 501 which determines the desired amount of yielded hydrogen during the start-up process of a SGG. During step 501, if a negligible amount of yielded hydrogen in the product stream is acceptable and a shorter warm-up period (the time period to achieve a desired SGG operating temperature) is desired during the start-up process, process 500 would proceed to step 502. During step 502 the equivalence ratio can be selected to be at or close to stoichiometry, so that both reactants are essentially entirely consumed in combustion processes and the SGG is essentially operated as a burner at start-up. During step 501, if more than a negligible amount of yielded hydrogen in the product stream is desired and a longer warm-up period is acceptable during the start-up process, process 500 would proceed to step 503. During step 503 the equivalence ratio is selected to be fuel-rich, which produces some $H_2$ but tends to result in a longer period for the SGG to reach a desired operating temperature. The equivalence ratio can be controlled by adjusting the mass flow rate of the fuel in step 504, for a desired start-up condition, as the critical flow venturi can passively meter the mass flow of the oxidant and effectively atomize a liquid fuel during start-up. Using the SGG to self-heat (and optionally to heat other system components) in the manner described (rapidly with essentially no hydrogen production or more slowly with some hydrogen production) can reduce or obviate the need for a separate secondary oxidant and/or fuel circuit or combustor in the system. During step 502 and step 503, the equivalence ratio need not be at one constant setting, for example, it can comprise one or more equivalence ratio settings and change at a variable rate.

In preferred embodiments of the apparatus and methods described above, the fuel processor is a syngas generator (SGG) that is a non-catalytic partial oxidation reformer which during normal operation is operated to produce a syngas stream. However, the fuel processor design and operating methods described herein can be implemented in various types of fuel processors including SGGs, reformers or reactors used to produce hydrogen-containing gas streams. These can be of various types, for example, catalytic partial oxidizers, non-catalytic partial oxidizers, and/or autothermal reformers. Suitable reforming and/or water-gas shift catalyst can be employed in the fuel processor.

The fuel supplied to the fuel processor can be a liquid fuel (herein meaning a fuel that is a liquid when under IUPAC defined conditions of standard temperature and pressure) or a gaseous fuel. Suitable liquid fuels include, for example, diesel, gasoline, kerosene, liquefied natural gas (LNG), fuel oil, methanol, ethanol or other alcohol fuels, liquefied petroleum gas (LPG), or other liquid fuels from which hydrogen can be derived. Alternative gaseous fuels include natural gas and propane.

The fuel processor can be deployed in various end-use mobile or stationary applications where a hydrogen-consuming device is employed. The product stream can be directed to one or more hydrogen-consuming devices for example an exhaust after-treatment device, a fuel cell, or a combustion engine.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A fuel processor for producing a hydrogen-containing product stream from a fuel stream and an oxidant stream, said fuel processor comprising a fuel inlet port, an oxidant inlet port, a product outlet port, and an outer shell housing a reaction chamber, wherein said fuel processor further comprises:
   a mixing tube disposed within said reaction chamber, said mixing tube fluidly connected to receive said oxidant stream from said oxidant inlet port and said fuel stream from said fuel inlet port, said mixing tube capable of forming a combined reactant stream having a flame speed and directing said combined reactant stream substantially axially into said reaction chamber at a speed maintained above said combined reactant stream flame speed, wherein said reaction chamber further comprises:
   (i) a turn-around chamber;
   (ii) a turn-around wall at one end of said turn-around chamber, said turn-around wall being shaped to re-direct said combined reactant stream outwardly from a central axis and then back through said turn-around chamber in substantially the opposite direction, so that in said turn-around chamber the redirected stream surrounds and is in contact with said combined reactant stream flowing substantially axially in the opposite direction; and
   (iii) an annular section surrounding said mixing tube, located downstream of said turn-around chamber through which a product stream flows before exiting said fuel processor through said product outlet port;
   wherein said turn-around chamber and said turn-around wall are shaped to create a low velocity zone between the opposing reactant streams and to create eddies in said low velocity zone for stabilizing the location of a flame in the fuel processor during operation.

2. The fuel processor of claim 1 wherein said turn-around chamber is free of flow separation structures and flow impeding structures.

3. The fuel processor of claim 1 wherein said turn-around chamber does not contain a catalyst for promoting conversion of said fuel and oxidant streams.

4. The fuel processor of claim 3 wherein said fuel processor is a non-catalytic syngas generator.

5. The fuel processor of claim 1 wherein said oxidant inlet port is fluidly connected to receive exhaust gas from a combustion engine.

6. The fuel processor of claim 1 wherein the diameter of said turn-around chamber is about 3-7 times greater than the diameter of the outlet of said mixing tube.

7. The fuel processor of claim 1 wherein the diameter of said turn-around chamber is about 5 times greater than the diameter of the outlet of said mixing tube.

8. The fuel processor of claim 1 wherein the distance from the average plane of said turn-around wall to the outlet of said mixing tube is about 4-11 times the diameter of the outlet of said mixing tube.

9. The fuel processor of claim 1 wherein the distance from the average plane of said turn-around wall to the outlet of said mixing tube is about 7-8 times the diameter of the outlet of said mixing tube.

10. The fuel processor of claim 1 further comprising a critical flow venturi located upstream of said mixing tube.

11. The fuel processor of claim 1 wherein said reaction chamber comprises an annular particulate filter surrounding said mixing tube, located downstream of said turn-around chamber.

12. The fuel processor of claim 11 wherein said annular particulate filter is disposed substantially concentrically around said mixing tube.

13. The fuel processor of claim 12 further comprising a concentric sleeve type heat exchanger disposed within said shell housing.

14. The fuel processor of claim 1 wherein said turn-around wall is shaped with a central peak that protrudes towards said mixing tube and is aligned with the axis of said mixing tube.

15. The fuel processor of claim 1 further comprising more than one layer of thermal insulation wherein each layer of thermal insulation has thermal insulating property that differs from the thermal insulating property of each other layer of thermal insulation.

16. The fuel processor of claim 1 wherein said reaction chamber is formed by a layer of thermal insulation.

17. The fuel processor of claim 16 wherein said layer of thermal insulation is vacuum-formed.

18. The fuel processor of claim 1 further comprising a concentric sleeve type heat exchanger comprising an inner chamber fluidly connected to receive oxidant stream from said oxidant inlet port and direct it toward said mixing tube, and comprising a surrounding outer annular chamber fluidly connected to receive product stream from said reaction chamber and direct it toward said product outlet port.

19. The fuel processor of claim 18 wherein said heat exchanger is fluidly connected so that said oxidant stream and said product stream are directed through said concentric sleeve heat exchanger in a co-flow direction.

20. The fuel processor of claim 1 further comprising a glow plug.

21. The fuel processor of claim 20 wherein the tip of said glow plug is located in said low velocity zone.

22. The fuel processor of claim 20 wherein said glow plug is located in a lower portion of said turn-around chamber.

23. The fuel processor of claim 1 wherein said turn-around wall comprises one of a semi-horn torus, a semi-ring torus, a semi-cone torus, a semi-sphere and a pan-shaped structure.

* * * * *